3,289,156
ACOUSTICAL LOGGING FOR DETERMINING
FRACTURES
John C. Wilson, Houston, Tex., assignor to Dresser Industries, Inc., Dallas, Tex., a corporation of Delaware
Filed Dec. 30, 1963, Ser. No. 334,181
6 Claims. (Cl. 340—18)

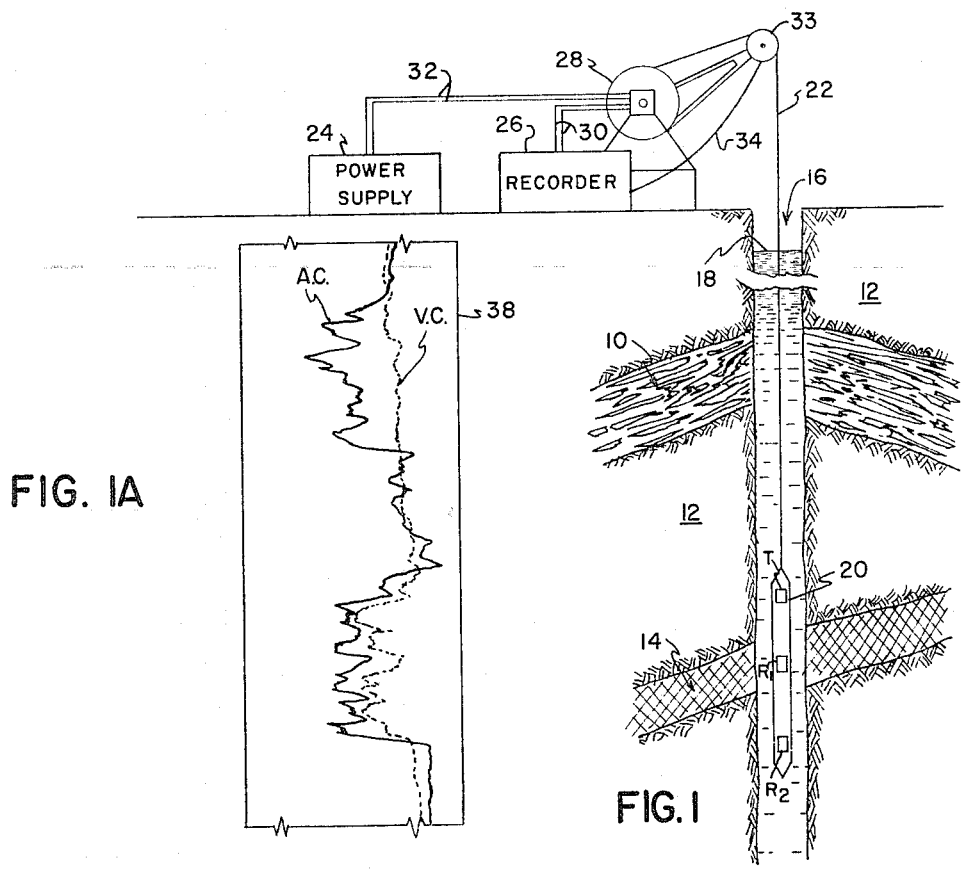
FIG. 1A
FIG. 1
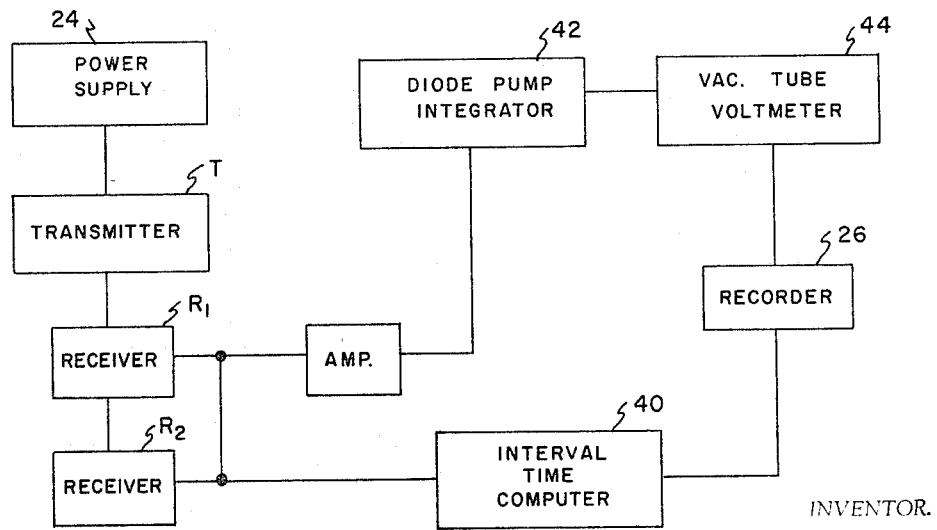
FIG. 2
INVENTOR.
JOHN C. WILSON
BY
ATTORNEY

This invention relates to acoustical logging, and more particularly to improved apparatus and method of acoustical logging for determining fractures in formations encircling an earth borehole.

In the art of "logging" earth boreholes; that is, obtaining information concerning characteristics of the formation penetrated by a borehole, it is well known, in general, the velocity of acoustic waves through different types of earth formations varies over a wide range of velocities. The velocity of the acoustic wave in subsurface formations depends upon the elastic property of the rock matrix, the porosity of the formations and their fluid content and pressure. Thus, by comparison of relative travel times of acoustic waves, it is possible to establish criteria which may be interpreted into data highly useful in studies conducted with a view toward ascertaining the presence or absence of petroleum gas, water, minerals or the like in the formations. Such logs are commonly referred to in the industry as acoustic velocity logs and are customarily used to determine the porosity of the formation. Fundamentally, acoustic velocity logging involves determining the time required for an acoustic wave to travel through a definite length of formation. These travel times are recorded continuously, versus depth, as the logging tool is pulled up the borehole, and are inversely proportional to the speed of sound in the various formations.

As mentioned, the acoustic velocity log is useful in determining the porosity of a formation. However, in certain formations, such as limestone, it has been ascertained that a naturally fractured formation will be the best producing zone. For example, in tight limestone, the only formations that will produce are those that are naturally fractured. If the formation is naturally fractured, a zone with 2% porosity can produce. While formations can be artificially fractured, such a procedure is expensive and the fractures do not go very deep radially of the borehole, whereas natural fractures usually go very deep. Accordingly, it can be seen that the location of fractured zones is very useful.

It has been found that the signal received by the detection stations is a very complex signal which is characteristic of the acoustic pattern of the acoustic energy traveling between the transmitter and the detection station. This signal is indicative of the amplitude of the wave and reflects the loss of energy in going from the transmitter to the receiver. It has been found that the amplitude of the wave, in addition to being affected by the aforementioned factors which affect velocity, is also affected by any fracturing of the formation. While the amplitude of the acoustic wave is affected by the fractures, the velocity of the acoustic wave does not appear to be so affected; or, if affected, not to such a degree. Accordingly, it has been found that, by measuring the total amplitude of the acoustic wave and recording it as a curve correlative with depth and comparing it with a velocity curve, zones of fracture may be determined.

It is the object of the present invention to provide an improved acoustical logging method and apparatus for determining fractures in formations.

It is another object of the invention to utilize the total amplitude of the acoustic wave to determine any fracturing of the formation.

It is a further object to record the velocity and the total amplitude of the acoustic wave to determine by departure any area of fracturing in the formation.

It is a still further object to provide an acoustical well logging system, wherein both a velocity curve and a total amplitude curve is provided, so that the fracture in the formation may be determined.

In order to accomplish the above an acoustical well logging system is provided which has provisions for measuring the total amplitude of the acoustic wave, as well as the velocity. Velocity and amplitude curves are then recorded in a correlative relation whereby any fracturing of the formation may be determined.

The above and still further objects, features and advantages of the present invention will become apparent upon consideration of the following detailed description of one embodiment thereof, especially when taken in conjunction with the accompanying drawings, wherein:

FIG. 1 is a diagrammatic representation illustrating the system of the present invention, with the logging tool positioned within a borehole penetrating an earth formation; also shown is a log representing the formation shown;

FIG. 1A is a diagrammatic representation of a log representing the formation shown in FIG. 1;

FIG. 2 is a block diagram of the circuitry of the system illustrated in FIG. 1.

Referring to FIGURE 1, there is illustrated a sectional view of a portion of the earth's crust made up of a plurality of different lithological strata, or formations, such as 10, 12 and 14, which are traversed by a borehole 16. Usually, the borehole is filled with water, mud or other drilling fluid, whose upper surface is indicated at 18. Within the borehole 16 there is shown an elongated logging tool 20, which is moved through the borehole 16 by a cable 22.

As will be understood by those skilled in the art, the cable 22 will be of adequate strength to safely carry the weight of the tool 20, and will include a plurality of insulated conductors adapted to conduct electrical power from a source 24 at the surface to certain elements carried by the tool 20, and also adapted to conduct from other elements within the tool 20 electrical signals to the surface where they may be continuously recorded by recording means 26 as the tool is moved along the borehole 16. The cable 22 may be conveniently carried upon a reel 28, provided with slip rings and brushes or equivalent means permitting electrical connection of the insulated conductors in the cable to the power source 24 and recording means 26 through pairs of conductors 30 and 32, respectively.

So that the record produced by the recording means 26 may be continuously correlated with the depth of the tool 20 in the borehole, a measuring wheel 33 may be provided adjacent the mouth of the borehole and suitable mechanism associated with the measuring wheel may be connected by means of connections 34 to recorder 26 in a manner well understood in the well logging art.

The logging tool includes a transmitter T at its lower end and two receivers or detecting stations R1 and R2, vertically spaced above the transmitter T. The receiver R2 is supported and maintained a predetermined distance from receiver R1 by an acoustic isolator unit of a predetermined length. As is well known in the art, the transmitter T is capable of converting electrical energy into an acoustic impulse. Means are provided to repetitively generate individual acoustic impulses. The receivers may be transducers which convert acoustic energy received into electrical energy which is representative of acoustic energy received. Appropriate amplifiers may be part of the detecting stations.

As the logging tool is moved through the borehole, the transmitter is caused to repetitively produce individual acoustic waves. Thus, a plurality of discontinuous, individual, acoustic waves is produced, one at each of the regularly spaced-apart levels or borehole stations. The locations of the stations in and along the borehole are not marked or characterized by any particular physical object, the stations being in a sense imaginary and defined only as locations along the extent of the borehole at which an acoustic wave is produced by the transmitter. The transmitter is fired at regular intervals, and, if the tool is moving at a constant speed, the firings will be at unit distances. However, if there is a change of speed, the results will not be effected. The means for causing the transmitter to produce an acoustic wave may be of various sorts of constructions, as is well known in the art.

The individual acoustic wave emanating from the transmitter travels away therefrom in substantially all directions. A portion of the energy of the wave is spent in traveling of the wave upwardly and downwardly through the fluid, usually drilling mud, which fills the borehole. Another portion of the energy of the wave is consumed in reflections from the borehole wall. Some of the energy of the wave is expended in wave travel in and through the rock or earth encircling the borehole, where refraction and reflection occur. It is that portion of the wave energy which propagates the wave through encircling formation in a direction parallel to the borehole that is principally employed in accomplishing acoustic logging. As the initial wave front spreads outwardly from its source and through the borehole fluid, it moves toward the two receivers; also it reaches the borehole wall where it is refracted and enters into the encircling earth formation or rock; then a portion of the refracted wave courses longitudinally along side of the borehole. Since the acoustic wave front travels faster through the encircling rock than it does through fluid in the borehole, a certain part of the refracted or rock-transmitted wave front outdistances the fluid-transmitted wave front. As the fluid-transmitted wave front travels along the boundary of the borehole wall, the more rapidly traveling rock-transmitted wave front is, itself, refracted at the bore hole boundary, entering another or third wave front in the fluid, which travels inwardly toward the center of the borehole. It is this third wave front which, a short distance up or down the borehole from the transmitter, is relatively far ahead of the initial or primary fluid-transmitted wave front and is first detected by the nearest receiver and also by the most distant receiver. The time interval elapsing between the detection of the most advanced wave front by the first receiver and the detection of the same wave front by the second receiver may be taken to be equal to the time interval required for the wave front to travel a distance through the encircling rock or formation equal to the distance between the receivers.

By suitably selecting comparable time points, one on each of the electrical waves, the time interval between the two time points is a substantially exact replica or measure of the above-mentioned time interval required for an acoustic wave to travel a unit distance through the borehole-encircling rock. This time interval determines the velocity of the waves in said formation. This time interval may be determined either in subsurface instrumentation in the logging tool 20, or the signals or pulses representing the first arrivals may be transmitted to the surface, where the signals are fed into an interval time computer 40, the time interval is determined and then a signal representing the time interval is transmitted to one channel of the recorder 26, where it is recorded on a chart 38 correlated in relation to depth. If the signals are sent to the surface, suitable amplification should be made in the tool, as is well known in the art. This curve VC is the acoustic velocity curve which is one of the more common ways of determining porosity of the formation.

The signal received by the detecting stations R1 and R2 is a very complex signal which is characteristic of the acoustic pattern of the acoustic energy traveling between the transmitter and the receiver. This signal is indicative of the amplitude of the wave and reflects the loss of energy in going from the transmitter to the receiver. The signals from each burst of the transmitter, received by one of the detecting stations, is amplified and then fed into a diode pump integrator 42, or other suitable means, where it is integrated to determine the total energy lost in the wave traveling in the formation. This integrated signal is then fed into a vacuum tube voltmeter 44 and then into a channel of a recorder where the information is plotted as a second or amplitude curve AC, correlated with the velocity curve previously mentioned.

The velocity curve VC depends upon the elastic property of the rock matrix, the porosity of the formation and the fluid content and pressure. The amplitude curve AC in addition is affected by any fracturing of the formation. The fractures cause a loss in energy of the signal. Accordingly, when the acoustic wave is traveling through unfractured formation, the velocity curve VC and amplitude curve AC will be comparatively the same. However, when a fracture is encountered, there will be a loss of energy in the amplitude, and accordingly the amplitude curve AC will drop off, thereby permitting the identification of a fractured formation.

The amplitude curve AC reflects the total amplitude of the acoustic wave, with the exception of the gating out of the transmitter blast which is to get rid of erroneous data. However, all of the signal received by the detecting station is used. By using the entire amplitude signal, rather than a gated portion of such signal, a truer result may be obtained, for an integrating circuit which does not take the entire wave train is subject to be affected by the speed of the wave train through the formations. If the speed through the formation is fast, there will be more cycles in the gated portion of the signal than for a like gated portion of a signal through a slow formation. Therefore, if the velocity is fast, an error may result because the signal may not indicate the fracture even though it may be there, since the integrating circuit is integrating twice as many cycles.

Accordingly, it can be seen that by determining the total amplitude as well as the velocity of each acoustic wave, and then recording them in a correlative relation, the total amplitude curve will diminish in zones of fracture, whereas the velocity curve will not be so affected, thereby permitting the determination of the fracture zones. While apparatus has been described which will permit such determination from a single run in the borehole, it is also possible to make one run to determine the velocity and then a second run to determine the amplitude. The logs produced by the two runs are then correlatively recorded.

It should be understood, however, that the specific apparatus herein illustrated and described are intended to be representative only, as many changes may be made therein without departing from the invention as set forth in the appended claims.

I claim:
1. A method of acoustic logging of the formations encircling an earth borehole to determine fractures in said formations comprising:
  repetitively generating acoustic waves in the borehole;
  detecting arrival of each of such waves at each of a pair of detecting stations spaced at a fixed distance apart longitudinally and deriving electrical signals indicative of said arrivals;
  determining from said signals the time interval between the respective arrivals of said acoustic wave at said two stations to determine the velocity of said waves in said formation;
  detecting at one of said stations the total amplitude of the acoustic wave arriving at the station, deriving an electrical signal characteristic of the acoustic pattern of said acoustic energy traveling in said formation, integrating said signal to determine the total energy loss of each of said waves in said formation;

recording relative to depth a log of the velocity and superimposing thereon a log of total energy loss and noting areas of departure whereby areas of fracture in the formation may be determined.

2. A method of acoustic logging of the formations encircling an earth borehole to determine fractures in said formations comprising:

repetitively generating acoustic waves in the borehole;

detecting arrival of each of such waves at each of a pair of detecting stations spaced at a fixed distance apart longitudinally and deriving electrical signals indicative of said arrivals;

determining from said signals the time interval between the respective arrivals of said acoustic wave at said two stations to determine the velocity of said waves in said formation;

detecting the total amplitude of the acoustic wave, deriving an electrical signal indicative of said total amplitude of each of said waves, and integrating said signal to determine the total energy loss of each of said waves in said formation;

recording relative to depth a log of the velocity and superimposing thereon a log of the energy loss and noting areas of departure whereby areas of fracture in the formation may be determined.

3. A method of acoustic logging of the formation encircling an earth borehole, comprising:

repetitively generating acoustic waves in a borehole;

determining from the first arrival of said waves at a detecting station the time interval of such arrival and deriving therefrom a log representing the velocity of said waves in said formation;

determining from the amplitude of the signal the energy loss in said wave and deriving therefrom a log representing the energy loss of said wave in said formation;

recording said velocity log and superimposing thereon the energy loss log whereby the areas of fracture in the formation may be determined by noting the drop off of the amplitude log relative to the velocity log.

4. A method of acoustic logging of the formations encircling an earth borehole, comprising:

repetitively generating acoustic waves in the borehole;

detecting first arrival of each of such waves and deriving electrical signal indicative of said arrivals;

determining from said signals the time interval between the respective arrivals of said acoustic waves to determine the velocity of said waves in said formation, detecting the total amplitude of the acoustic wave, deriving an electrical signal indicative of said amplitude and integrating said signal to determine the energy of said waves in said formation;

recording, relative to depth, a log of the velocity and superimposing thereon a log of energy and noting areas of departure whereby areas of fracture in the formation may be determined.

5. An acoustic well logging system comprising:

subsurface apparatus having a repetitively energized transmitter of acoustic energy and two receiving transducers of acoustic to electrical energy disposed in fixed relation thereto;

apparatus for positively identifying the time interval between the respective first arrivals of acoustic energy at said two receiving transducers following energization of said transmitter;

means for determining said time interval and converting it into an electrical signal representing the time interval;

apparatus for integrating the total amplitude wave received by one of said receivers and converting it into a signal representing the total amplitude of the energy received;

means for recording said time interval signals and total amplitude signals superimposed on each other.

6. An acoustic well logging system comprising:

subsurface apparatus having a repetitively energized transmitter of acoustic energy and two receiving transducers of acoustic to electrical energy disposed in fixed relation to each other;

apparatus for positively identifying the time interval between the respective first arrivals of acoustic energy at said two receiving transducers following energization of said transmitter;

means for determining the same time interval and converting it into an electric signal representative of said time interval;

apparatus for receiving the total acoustic wave received following energization of said transmitter and converting it to an electrical signal representative of the amplitude of said acoustic energy;

means for integrating said amplitude signal into a second signal indicative of said amplitude;

means for continuously recording said time interval signals and superimposing said total amplitude signals therewith relative to depth.

References Cited by the Examiner
UNITED STATES PATENTS

| | | | |
|---|---|---|---|
| 2,233,992 | 3/1941 | Wyckoff | 181—.5 |
| 2,691,422 | 10/1954 | Summers et al. | 181—.5 |
| 3,050,150 | 8/1962 | Tixier | 340—18 X |
| 3,175,638 | 3/1965 | Hubbard et al. | 340—18 X |

SAMUEL FEINBERG, *Primary Examiner.*

BENJAMIN A. BORCHELT, *Examiner.*

R. M. SKOLNIK, *Assistant Examiner.*